(12) United States Patent
Asai

(10) Patent No.: US 11,765,295 B2
(45) Date of Patent: Sep. 19, 2023

(54) COMPUTER-READABLE MEDIUM, INFORMATION PROCESSING DEVICE, AND SYSTEM FOR SETTING UP PROGRAM ON EACH OF TERMINAL DEVICES

(71) Applicant: BROTHER KOGYO KABUSHIKI KAISHA, Nagoya (JP)

(72) Inventor: Norihiko Asai, Tajimi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 96 days.

(21) Appl. No.: 17/536,374

(22) Filed: Nov. 29, 2021

(65) Prior Publication Data
US 2022/0174169 A1  Jun. 2, 2022

(30) Foreign Application Priority Data
Nov. 30, 2020  (JP) .................................. 2020-198018

(51) Int. Cl.
*G06F 8/61* (2018.01)
*H04N 1/00* (2006.01)

(52) U.S. Cl.
CPC .......... *H04N 1/00938* (2013.01); *G06F 8/61* (2013.01); *G06F 8/64* (2013.01)

(58) Field of Classification Search
None
See application file for complete search history.

(56) References Cited

U.S. PATENT DOCUMENTS

| | | | |
|---|---|---|---|
| 2005/0195446 A1* | 9/2005 | Kasatani | H04N 1/00331 358/402 |
| 2009/0031252 A1* | 1/2009 | Toda | G06F 9/451 715/826 |
| 2018/0067704 A1* | 3/2018 | Kobayashi | G06F 3/1285 |
| 2018/0183953 A1* | 6/2018 | Ormond | H04N 1/0097 |
| 2018/0198948 A1* | 7/2018 | Hiramoto | H04N 1/00204 |
| 2018/0213098 A1* | 7/2018 | Ito | H04N 1/00503 |

(Continued)

FOREIGN PATENT DOCUMENTS

| | | | | |
|---|---|---|---|---|
| EP | 3118736 A1 * | 1/2017 | | B41J 29/38 |
| EP | 4102358 A1 * | 12/2022 | | G06F 8/34 |

(Continued)

*Primary Examiner* — Philip Wang
(74) *Attorney, Agent, or Firm* — Scully, Scott, Murphy & Presser, PC

(57) ABSTRACT

A non-transitory computer-readable medium stores computer-readable instructions that are executable by a processor of a first terminal device compatible with a first platform, the instructions being configured to, when executed by the processor, cause the first terminal device to accept selection of an image processing apparatus connected with the first terminal device, accept selection of a function to be set up on the first terminal device from among one or more functions executable by the image processing apparatus, install, into the first terminal device, a first program compatible with the image processing apparatus and the first platform, and output an access information image. The access information image represents access information based on the selected function and an address of a web page representing a site of a supply source for a second program compatible with the image processing apparatus and a second platform.

16 Claims, 11 Drawing Sheets

(56) References Cited

U.S. PATENT DOCUMENTS

| | | | |
|---|---|---|---|
| 2018/0288820 A1* | 10/2018 | Shibata | H04W 76/14 |
| 2018/0373468 A1* | 12/2018 | Saigusa | G06F 3/1228 |
| 2019/0303122 A1* | 10/2019 | Ban | G06F 9/44505 |
| 2019/0377525 A1* | 12/2019 | Nakajima | G06F 21/34 |
| 2020/0004473 A1* | 1/2020 | Saigusa | G06F 3/1232 |
| 2020/0053231 A1 | 2/2020 | Kikuchi | |

FOREIGN PATENT DOCUMENTS

| | | |
|---|---|---|
| JP | 2015-510635 A | 4/2015 |
| JP | 2019-175100 A | 10/2019 |
| JP | 2020-027358 A | 2/2020 |
| WO | 2013/117995 A2 | 8/2013 |

\* cited by examiner

COMPUTER-READABLE MEDIUM, INFORMATION PROCESSING DEVICE, AND SYSTEM FOR SETTING UP PROGRAM ON EACH OF TERMINAL DEVICES

CROSS REFERENCE TO RELATED APPLICATIONS

This application claims priority under 35 U.S.C. § 119 from Japanese Patent Application No. 2020-198018 filed on Nov. 30, 2020. The entire subject matter of the application is incorporated herein by reference.

BACKGROUND

A technology to set up a program for controlling an image processing apparatus on a terminal device has been known. For instance, an installer to install a fax driver for controlling a fax machine has been disclosed.

SUMMARY

There are cases in which a single user may use the same image processing apparatus on a plurality of terminal devices having respective different platforms. In such cases, a program compatible with the image processing apparatus needs to be set up on each of the terminal devices with the different platforms. However, the program to be installed differs for each platform, and the address of a site as a program supply source differs for each program. In addition, the image processing apparatus has a plurality of functions, which include one or more necessary functions and one or more unnecessary functions for the user. Hence, it is preferable to display appropriate information as to which functions are necessary or unnecessary for the user. Therefore, there is room for improvement in setting up the corresponding program on each terminal device.

Aspects of the present disclosure are advantageous to provide one or more improved techniques to reduce time and effort required for a user to set up a program for controlling an image processing apparatus on each of terminal devices.

According to aspects of the present disclosure, a non-transitory computer-readable medium is provided, which stores computer-readable instructions that are executable by a processor of a first terminal device compatible with a first platform. The instructions are configured to, when executed by the processor, cause the first terminal device to accept selection of an image processing apparatus from among one or more devices connected with the first terminal device, accept selection of a function to be set up on the first terminal device, from among one or more functions executable by the selected image processing apparatus, install, into the first terminal device, a first program compatible with the selected image processing apparatus and the first platform, and output an access information image. The access information image represents access information based on the selected function and an address of a web page representing a site of a supply source for a second program. The second program is compatible with the selected image processing apparatus and a second platform.

According to aspects of the present disclosure, further provided is an information processing device that includes a user interface and a controller. The controller is configured to accept, via the user interface, selection of an image processing apparatus from among one or more devices connected with the information processing device, the information processing device being compatible with a first platform, accept, via the user interface, selection of a function to be set up on the information processing device, from among one or more functions executable by the selected image processing apparatus, and output an access information image. The access information image represents access information based on the selected function and an address of a web page representing a site of a supply source for a second-platform-compatible program. The second-platform-compatible program is compatible with the selected image processing apparatus and a second platform.

According to aspects of the present disclosure, further provided is a system that includes an image processing apparatus having one or more executable functions, a first terminal device compatible with a first platform, and a second terminal device compatible with a second platform. The first terminal device includes a first controller. The first controller is configured to accept selection of a function to be set up on the first terminal device, from among the one or more functions executable by the image processing apparatus, install, into the first terminal device, a first program compatible with the image processing apparatus and the first platform, and output an access information image. The access information image representing access information based on the selected function and an address of a web page representing a site of a supply source for a second program. The second program is compatible with the image processing apparatus and a second platform. The second terminal device includes a reading device, a display, and a second controller. The second controller is configured to read, by the reading device, the access information image output by the first terminal device, thereby obtaining the access information, and to access the address represented by the obtained access information, obtain the web page corresponding to the selected function, and display the obtained web page on the display.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

An illustrative embodiment according to aspects of the present disclosure will be described with reference to the accompanying drawings. In the illustrative embodiment, aspects of the present disclosure are applied to a system including a personal computer (hereinafter referred to as a "PC"), a mobile device, and a multi-function peripheral (hereinafter referred to as an "MFP").

Figure 1:
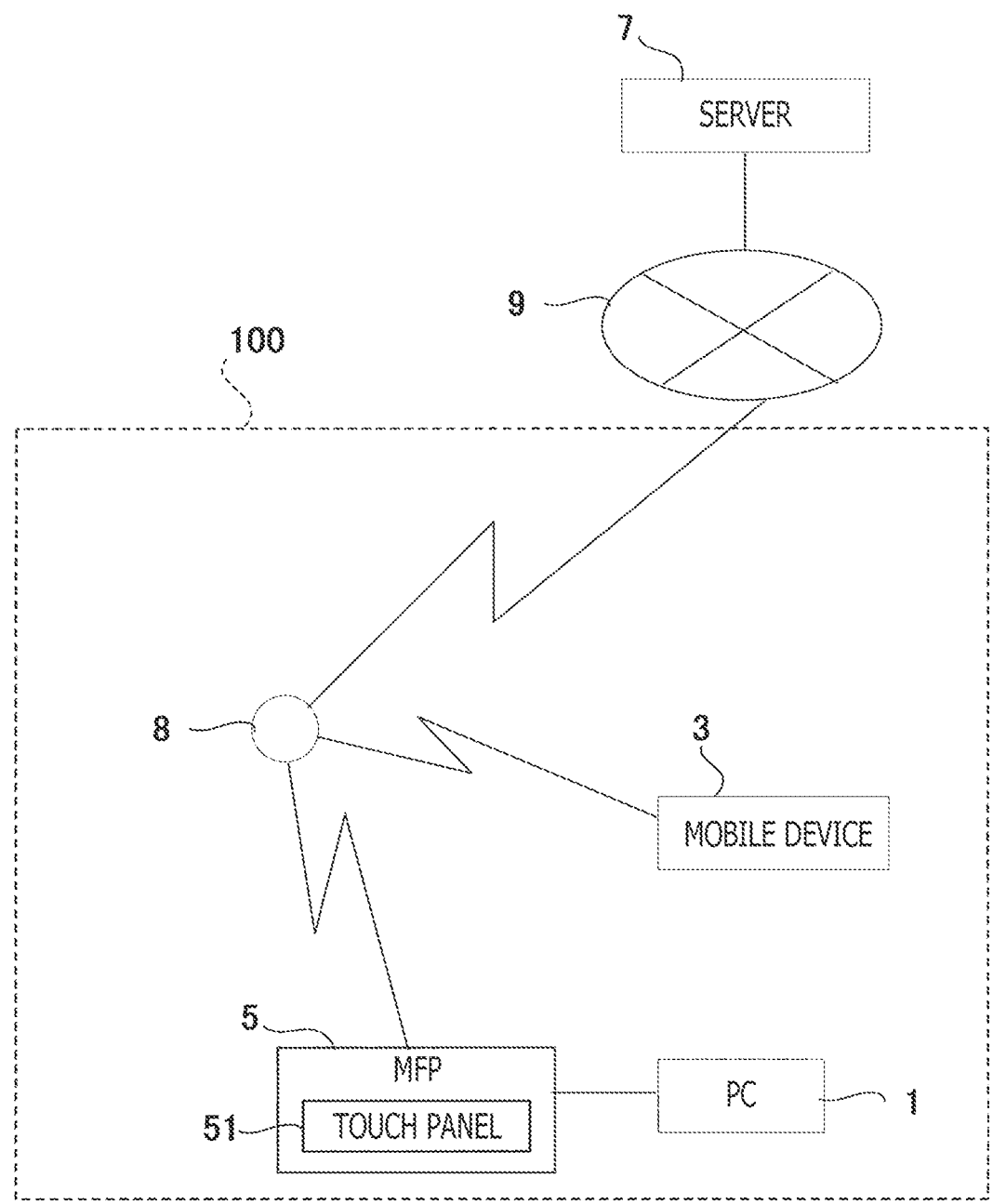
FIG. 1 schematically shows a configuration of a system including a personal computer (hereinafter referred to as a "PC"), a mobile device, and a multi-function peripheral (hereinafter referred to as an "MFP"), according to one or more aspects of the present disclosure.

FIG. 1 schematically shows a configuration of a system 100 in the illustrative embodiment. As shown in FIG. 1, the system 100 includes a PC 1, a mobile device 3, and an MFP 5. The PC 1 and the MFP 5 are connected with each other in a wired manner. The mobile device 3 and the MFP 5 are connected with an access point 8, and are connected with an Internet 9 via the access point 8. The PC 1 may be connected only with the MFP 5 or with a plurality of image processing apparatuses including the MFP 5. The PC 1 may be connected with the MFP 5 via the access point 8.

The access point 8 is a relay device on a network, and is configured to mediate communication in response to a connection request from a communication terminal. For instance, the access point 8 may be a wireless Wi-Fi router ("Wi-Fi" is a registered trademark of the non-profit Wi-Fi Alliance).

The MFP 5 has at least one of image processing functions such as a printing function, a scanning function, and a fax function. The MFP 5 includes a touch panel 51 having user interface functions such as a display function and an operation function. Namely, the MFP 5 is configured to receive, via the touch panel 51, user operations such as an operation to instruct the MFP 5 to execute each function and operations to configure settings for each function. Instead of the touch panel 51, the MFP 5 may include a separate display and a separate user-operable device. The PC 1 is enabled to remotely control the MFP 5 by installing and setting up, on the MFP 5, a print application 23 (see FIG. 2) compatible with a type of the MFP 5. Further, the mobile device 3 is enabled to remotely control the MFP 5 by installing and setting up, on the mobile device 3, a print application 43 (see FIG. 3) compatible with the type of the MFP 5.

Figure 2:
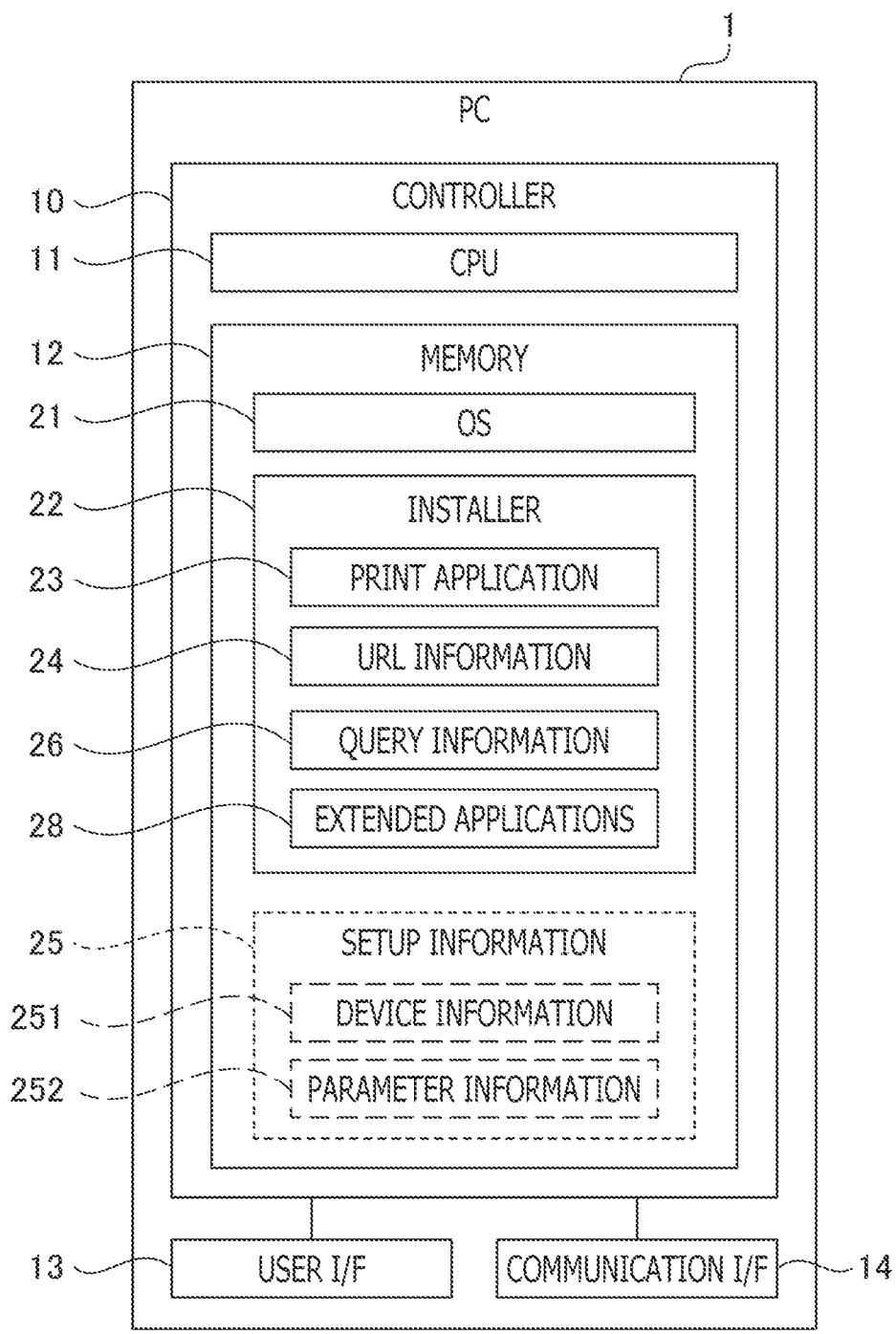
FIG. 2 is a block diagram showing an electrical configuration of the PC according to one or more aspects of the present disclosure.

FIG. 2 is a block diagram showing an electrical configuration of the PC 1. The PC 1 of the illustrative embodiment is configured to execute various application programs (hereinafter referred to as "applications"). The PC 1 includes a controller 10 including a CPU 11 and a memory 12. The PC 1 further includes a user I/F ("I/F" is an abbreviation for "interface") 13 and a communication I/F 14, which are electrically connected with the controller 10.

Figure 3:
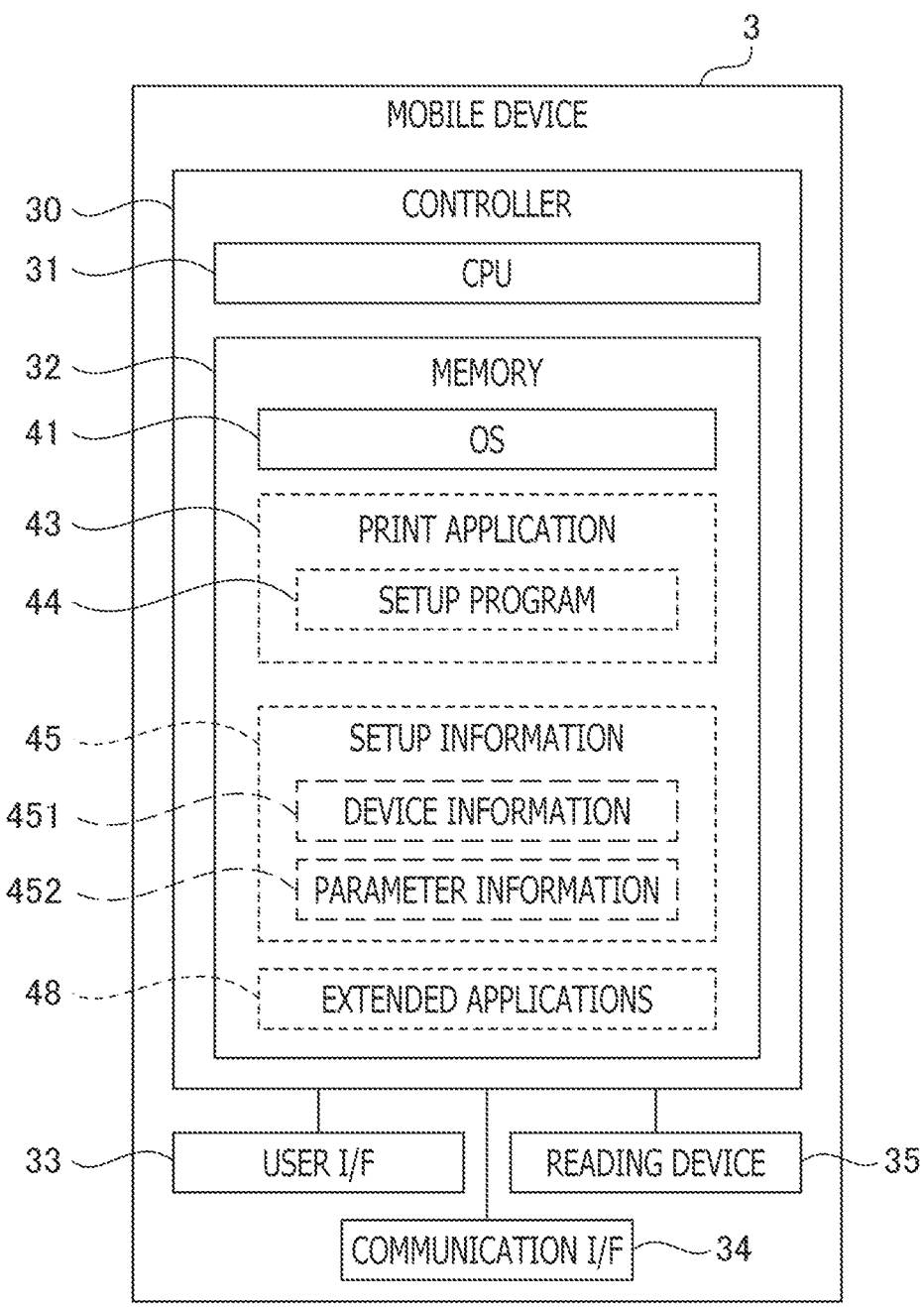
FIG. 3 is a block diagram showing an electrical configuration of the mobile device according to one or more aspects of the present disclosure.

FIG. 3 is a block diagram showing an electrical configuration of the mobile device 3. The mobile device 3 of the illustrative embodiment is configured to execute various applications. The mobile device 3 includes a controller 30 including a CPU 31 and a memory 32. The mobile device 3 further includes a user I/F 33, a communication I/F 34, and a reading device 35, which are electrically connected with the controller 30.

The controllers 10 and 30 shown in FIGS. 2 and 3 are generic terms for hardware and software used to control the PC 1 and the mobile device 3. Thus, each of the controllers 10 and 30 may not necessarily represent a single hardware element that actually exists in the PC 1 or the mobile device 3.

Each of the CPUs 11 and 31 shown in FIGS. 2 and 3 is configured to, based on user operations, perform various processes in accordance with programs read from a corresponding one of the memories 12 and 32. Each of the memories 12 and 32 may include at least one of storage devices such as a ROM, a RAM, an HDD, and a flash memory. Each of the memories 12 and 32 has one or more storage areas to store various types of data and various programs such as a startup program for starting the PC 1 or the mobile device 3. The memory 12 and 32 are also used as work areas when various processes are performed. Examples of "memories" according to aspects of the present disclosure may include, but are not limited to, buffers of the CPUs 11 and 31, as well as the aforementioned storage devices.

The examples of the "memories" according to aspects of the present disclosure may include, but are not limited to, non-transitory computer-readable storage media that are readable and writable by the CPUs 11 and 31. Examples of the non-transitory computer-readable storage media may include, but are not limited to, recording media such as CD-ROMs, DVD-ROMs, and USB memories as well as the aforementioned various types of storages. The non-transitory computer-readable storage media are also tangible media. On the other hand, an electrical signal carrying a program downloaded, e.g., from a server on the Internet, is a computer-readable signal medium, but is not included in the examples of the non-transitory computer-readable storage media.

Each of the user I/Fs 13 and 33 includes a hardware element to display information on a screen and a hardware element to accept input operations by the user. Each of the user I/Fs 13 and 33 may include at least one of user interface devices such as a display, a keyboard, and a mouse. Each of the user I/Fs 13 and 33 may include a touch panel having a display function and an input acceptance function.

The communication I/Fs 14 and 34 are connected with the access point 8 shown in FIG. 1. Each of the communication I/Fs 14 and 34 includes hardware to communicate with external devices such as the MFP 5 and the server 7 via the access point 8. Communication methods for the communication I/Fs 14 and 34 may be wired or wireless. The communication methods for the communication I/Fs 14 and 34 may be compliant with any of communication standards such as Ethernet ("Ethernet" is a registered trademark of Fuji Xerox Co., Ltd.), Wi-Fi ("Wi-Fi" is a registered trademark of the non-profit Wi-Fi Alliance), Bluetooth ("Bluetooth" is a registered trademark of Bluetooth SIG, Inc.), USB, and LAN. Each of the communication I/Fs 14 and 34 may have one or more configurations compatible with a plurality of communication methods. The reading device 35 may include a small camera incorporated in the mobile device 3. The reading device 35 is configured to read images including characters and images including two-dimensional barcodes.

As shown in FIG. 2, an operating system (hereinafter referred to as an "OS") 21 and an installer 22 are incorporated in the memory 12 of the PC 1. Examples of the OS 21 may include, but are not limited to, Windows ("Windows" is a registered trademark of Microsoft Corp.), macOS ("macOS" is a registered trademark of Apple Inc.), Linux ("Linux" is a registered trademark of Linus Torvalds), Chrome OS ("Chrome OS" is a registered trademark of Google LLC), and UOS ("UOS" is a registered trademark of Uniontech Software Technology Co., Ltd.). The installer 22 is a program provided by, for instance, a vendor of the MFP 5. The installer 22 may be stored in the PC 1 before or after shipment of the MFP 5. The installer 22 is for incorporating the print application 23 into the PC 1. Namely, the installer 22 is configured to, when executed, install the print application 23 into the PC 1 and set up the print application 23 installed. In the illustrative embodiment, the installer 22 is further configured to install extended applications 28 different from the print application 23. In this case, the installer 22 may also set up the extended applications 28 installed in the PC 1, in substantially the same manner as when setting up the print application 23 installed.

The installer 22 stores URL information 24. The URL information 24 contains information indicating a URL of a web page that represents a site as a supply source for each program that is compatible with the image processing apparatus (e.g., the MFP 5 in the illustrative embodiment) and is installable in the mobile device (e.g., the mobile device 3 in the illustrative embodiment). For instance, functions executable by one type of image processing apparatus are different from functions executable by another type of image processing apparatus. Therefore, the web page is created for each type of image processing apparatus. The installer 22 is compatible with a plurality of types of image processing apparatuses. The installer 22 stores, in the URL information 24, URLs of web pages for each type of image processing apparatus compatible with the installer 22.

For instance, the type of each image processing apparatus may be an apparatus type identified by a specific image processing method (e.g., an inkjet printing method or a laser printing method) and specific functions (e.g., an automatic document feeder function), or may be a model identified by a model number. In the illustrative embodiment, the type of each image processing apparatus will be described as the "model."

Basic functions of the MFP 5 are extended by incorporating into the PC 1 the extended applications 28 (see FIG. 2) compatible with the PC 1 and/or incorporating into the mobile device 3 extended applications 48 (see FIG. 3) compatible with the mobile device 3. The extended applications 48 are different from the print application 43. Hence, a web page of a site as a supply source for the extended applications 48 is created separately from a web page of a site as a supply source for the print application 43. Therefore, the URL information 24 stores a URL for the print application 43 and URLs for the extended applications 48. Examples of the sites as the supply sources for the programs (e.g., the print application 43 and the extended applications 48 in the illustrative embodiment) compatible with the mobile device 3 may include, but are not limited to, an application-downloading page provided by the vendor of the MFP 5, App Store ("App Store" is a registered trademark of Apple Inc.), and Google Play ("Google Play" is a registered trademark of Google LLC). Hereinafter, the programs compatible with the mobile device 3 may be referred to as the "mobile applications."

Further, the installer 22 stores query information 26. The query information 26 stores query parameters that indicate functions and settings.

The installer 22 has a function to generate and display QR code images ("QR Code" is a registered trademark of DENSO WAVE INCORPORATED). Specifically, the installer 22 is configured to generate access information based on a URL stored in the URL information 24 and query parameters stored in the query information 26, and cause the user I/F 13 of the PC 1 to display a QR code image representing the generated access information. The access information is generated in a language analyzable by the server 7.

FIG. 2 shows a state of the PC 1 after the installer 22 is incorporated into the PC 1 and before installation of the print application 23 is performed by the installer 22. After the installation of the print application 23 is performed by the installer 22, the print application 23 may be incorporated into the PC 1, and the installer 22 may be deleted.

As shown in FIG. 3, an OS 41 is incorporated in the memory 32 of the mobile device 3. Examples of the OS 41 may include, but are not limited to, iOS ("iOS" is a registered trademark of Cisco Systems, Inc.), Android ("Android" is a registered trademark of Google LLC), and HarmonyOS ("HarmonyOS" is a registered trademark of Huawei Technologies Co., Ltd.). The OS 41 has its own installation program for incorporating applications into the memory 32. The mobile device 3 may install the print application 43 using the installation program of the OS 41. In FIG. 3, elements each surrounded by a dashed line represent that the elements have not been installed in the mobile device 3. Namely, FIG. 3 shows a state of the mobile device 3 in which installation of the print application 43 has not been completed.

The PC 1 shown in FIG. 2 and the mobile device 3 shown in FIG. 3 have different corresponding platforms. For instance, the differences between their corresponding platforms may include a difference in the type of software for setting up their respective print applications 23 and 43. The differences between their corresponding platforms may include a difference in the OS for each of the destination terminals in which their respective print applications 23 and 43 are set up. The differences between their corresponding platforms may include a difference in whether the software for setting up their respective print applications 23 and 43 is provided by the vendor of the image processing apparatus (e.g., the MFP 5 in the illustrative embodiment). Specifically, in the illustrative embodiment, the types of the OSs 21 and 41 are different between the PC 1 and the mobile device 3. Further, it is different, between the PC 1 and the mobile device 3, whether installation of the print applications 23 and 43 by the installer provided by the vendor of the MFP 5 is possible. Further, programs for setting up the print applications 23 and 43 are different between the PC 1 and the mobile device 3. Namely, in the PC 1, the installer 22 performs installing and setting up the print application 23. Meanwhile, in the mobile device 3, the print application 43 is installed by a service (e.g., App Store or Google Play) provided by a service provider other than the vendor of the MFP 5, and is set up by a setup program 44 included in the print application 43 itself.

The print applications 23 and 43 are programs having functions to control the MFP 5, such as a function to generate print data for causing the MFP 5 to perform printing, and a function to configure settings for the printing. Setup information 25 and setup information 45, which are indicated by the dashed lines in FIGS. 2 and 3, are stored in the memories 12 and 32 when the print applications 23 and 43 are set up, respectively. For instance, the setup information 25 and the setup information 45 may be newly generated and stored when the print applications 23 and 43 are set up, respectively. In another instance, if default information, or setup information used by an application used in the past is available, such information may be updated and stored as the setup information 25 and 45. The setup information 25 and the setup information 45 are referred to by the print applications 23 and 43 to use the MFP 5, respectively. Each of the setup information 25 and 45 includes device information and parameter information.

The server 7 shown in FIG. 1 is, for instance, a storage provided on the Internet 9. The server 7 stores web page information that indicates sites as supply sources for mobile applications compatible with the image processing apparatus (e.g., the MFP 5 in the illustrative embodiment). The sites, indicated by the web page information stored in the server 7, may include web pages for download provided by the vendor of the image processing apparatus, and web pages for download provided by a service (e.g., App Store or Google Play) other than the vendor of the image processing apparatus.

The web page representing a site for download provided by the vendor of the image processing apparatus may be provided for each model of image processing apparatus and/or for each program downloadable into the mobile device 3. For instance, the server 7 may store web page information on a web page for the model of the MFP 5. Further, for instance, the server 7 may store web page information on a web page of a site as a supply source for each of the print application 43 and the extended applications 48. Each web page is given a URL that is an address on the Internet 9, and the URL is stored in the URL information 24 of the installer 22. Further, the server 7 stores information for explaining the functions of the image processing apparatus and functions of the programs.

For instance, each of the installer 22, the print application 43, and the extended applications 48 may be downloaded into a corresponding one of the PC 1 and the mobile device 3 via a web page provided by the server 7. In another instance, the installer 22 may be provided by a storage medium such as a CD or a DVD.

Next, operations by the PC 1, the MFP 5, and the mobile device 3 will be described. Each processing step in the following processes and flowcharts basically indicates a process by a corresponding CPU in accordance with instructions described in a program. A process of determination by a CPU may be described conceptually as "it is determined whether it is Matter B from Information A." Namely, each of processes such as "determining," "judging," "obtaining," and "acquiring" in the following description may represent a process by a corresponding CPU. The processes by the CPUs may include hardware control using an API of the OS 21 of the PC 1 or an API of the OS 41 of the mobile device 3. In the present disclosure, operations according to each program may be described without any mention of the OSs 21 and 41.

It is noted that "obtaining" or "acquiring" may be used as a concept that does not necessarily require a request. Further, "data" in the present disclosure may be expressed in a computer-readable bit sequence. Additionally, a plurality of pieces of data having substantially the same meaning or content but expressed in different formats shall be treated as the same data. The same may apply to "information" in the present disclosure. "Requesting" and "instructing" are concepts that represent to output information indicating what is requested and what is instructed to the other party. Further, the information indicating what is requested and what is instructed may be referred to simply as "request" and "instruction."

Figure 4A:
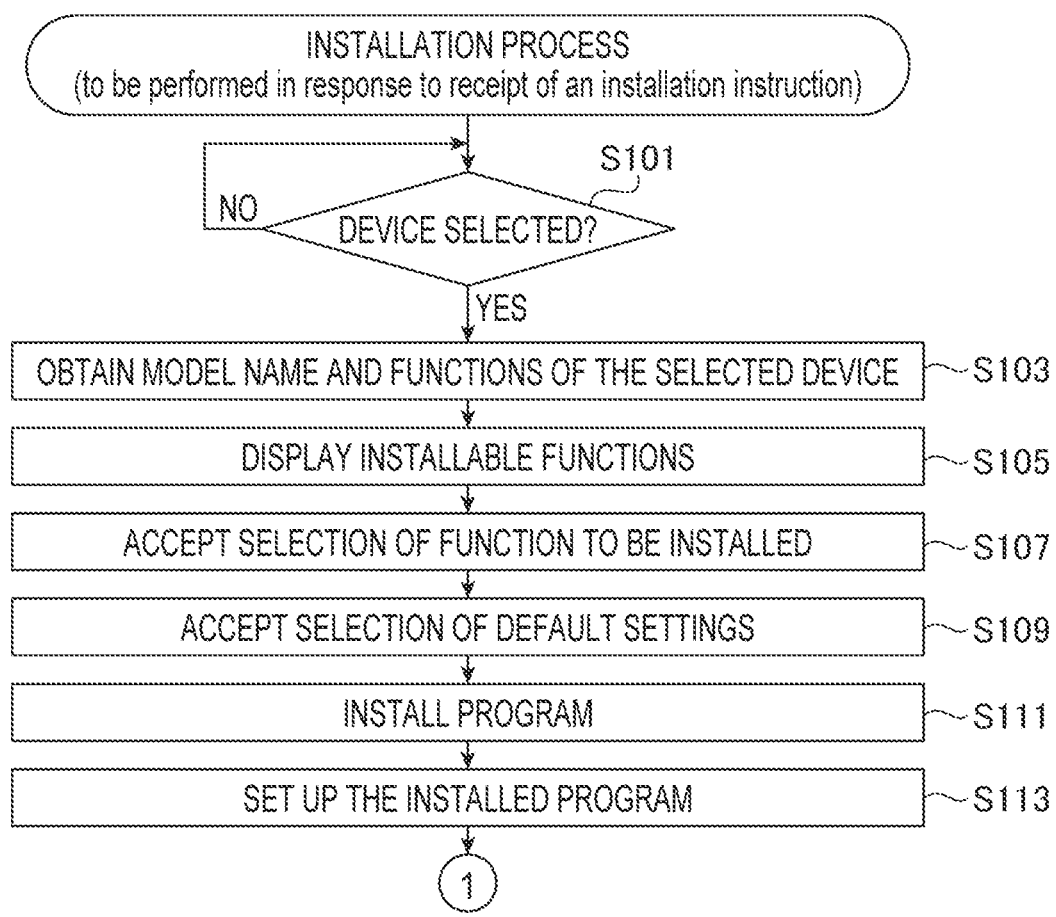
FIGS. 4A and 4B are flowcharts showing a procedure of an installation process to be performed by the PC, according to one or more aspects of the present disclosure.
Figure 4B:
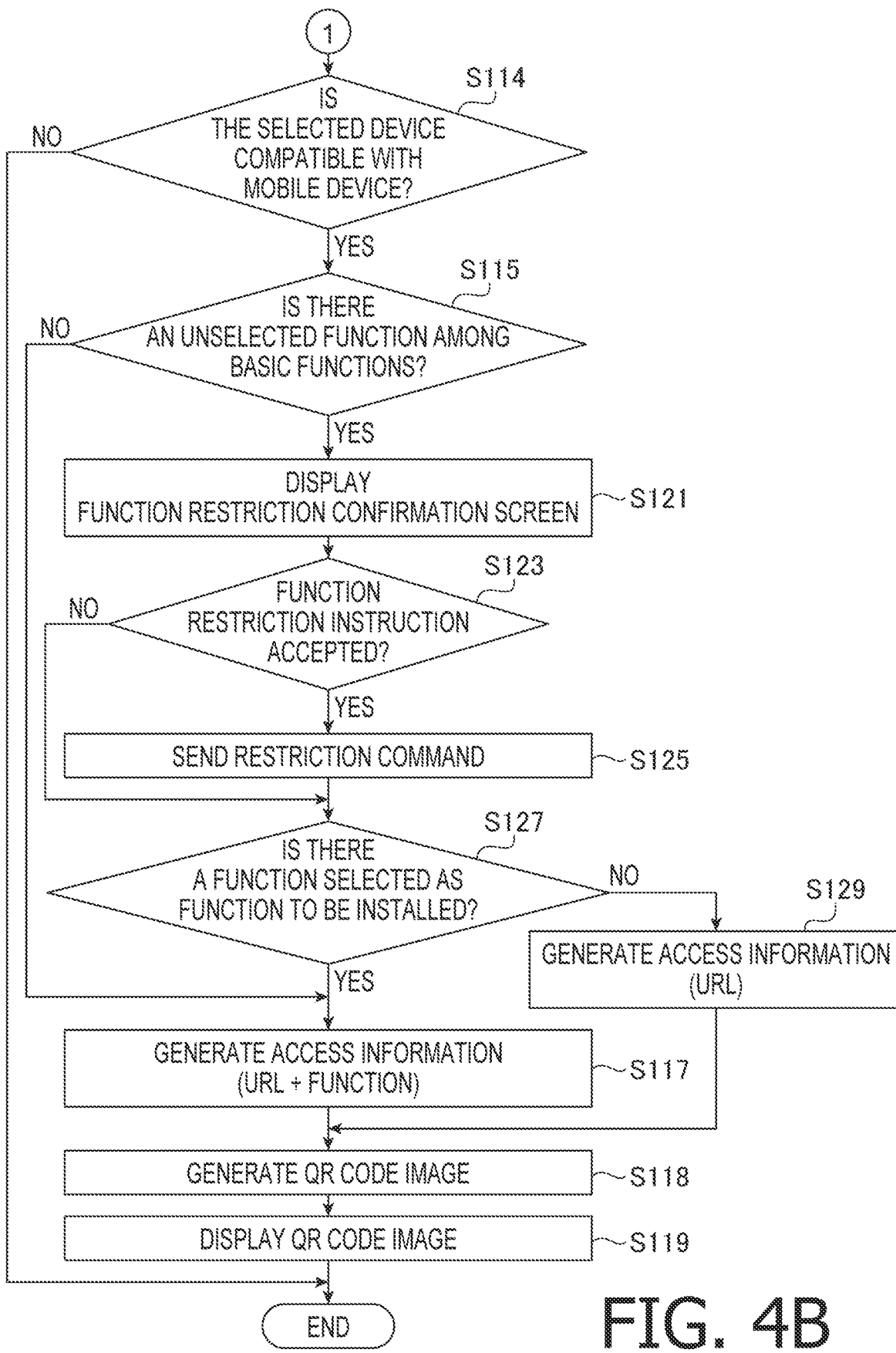

First, a procedure for installing and setting up the print application 23 and the extended applications 28 in the PC 1 will be described. FIGS. 4A and 4B are flowcharts showing a procedure of an installation process. When the PC 1 receives an installation instruction via the user I/F 13, the CPU 11 activates the installer 22, thereby performing the installation process shown in FIGS. 4A and 4B.

The CPU 11 determines whether a device has been selected (S101). Specifically, for instance, the CPU 11 searches for one or more devices on the network connected with the PC 1, causes the user I/F 13 to display the one or more devices found by the search, and receives a selection from among the one or more devices displayed on the user I/F 13.

For instance, when a plurality of devices including the MFP 5 are connected with the PC 1, the CPU 11 finds the plurality of devices, and displays the found devices on the user I/F 13 in a user-selectable manner. The CPU 11 accepts selection of the MFP 5 from among the plurality of devices via the user I/F 13. Further, for instance, if the MFP 5 is the only device connected with the PC 1, the CPU 11 accepts selection of the MFP 5. Thus, when the MFP 5 has been selected, the CPU 11 obtains, from the selected MFP 5, a model name and functions of the MFP 5 using the communication I/F 14 (S103). It is noted that for instance, the CPU 11 may obtain the model name from the MFP 5, and obtain, based on the obtained model name, the functions of the MFP 5 from a server managed by the vendor.

Based on the functions obtained in S103, the CPU 11 causes the user I/F 13 to display functions installable into the MFP 5 (S105). For instance, the CPU 11 displays, via the user I/F 13, a function selection screen 120 shown in FIG. 5. The function selection screen 120 displays thereon a function list 121, an OK button 124, and a cancel button 125. The function list 121 displays therein functions included in basic functions, and functions included in extended functions (see "Plug-in Functions" in the function list 121 in FIG. 5). Further, the function list 121 includes a check box 123 provided for each function to indicate a selection status of an associated function (i.e., to indicate whether the associated function is selected or not). The OK button 124 is an operable member to confirm the selected function(s). The cancel button 125 is an operable member for cancelling the installation of the selected function(s).

The basic functions are functions possessed by the MFP 5. The basic functions are executed via the touch panel 51 of the MFP 5 or by the print application 23. The installer 22 displays the basic functions in the function list 121 according to the functions obtained in S103.

The extended functions are functions associated with the functions possessed by the MFP 5. In the illustrative embodiment, the extended functions are executed by the extended applications 28 (see FIG. 2) different from the print application 23. The installer 22 stores the extended functions for each function of each model of image processing apparatus. The installer 22 displays the extended functions according to the selection of the functions included in the basic functions.

Examples of the extended functions may include, but are not limited to, a CD label printing function and a postcard printing function. The CD label printing function is a function to edit and print CD labels. The postcard printing function is a function to automatically lay out the location of an address to be printed on a postcard. The CD label printing function and the postcard printing function are associated with the printing function. The PC 1 is enabled to use the CD label printing function and the postcard printing function with a CD label printing application and a postcard printing application for PC being installed. For instance, if the MFP 5 is compatible with the CD label printing function and the postcard printing function, the installer 22 displays the CD label printing function and the postcard printing function as selectable functions in the function list 121 in response to the printing function being selected from among the basic functions. Meanwhile, the installer 22 does not display the CD label printing function or the postcard printing function in the function list 121 when the printing function is not selected from among the basic functions. If the MFP 5 stores the extended functions for each function of the MFP 5, the installer 22 may obtain the extended functions from the MFP 5 in S103. The CD label printing application and the postcard printing application that are compatible with the platform of the PC 1 may be included in examples of the extended applications 28.

The basic functions are usable from the mobile device 3 as well in which the print application 43 for mobile devices is incorporated. Further, the extended functions are usable from the mobile device 3 in which the extended applications 48 for mobile device are incorporated. The CD label printing application and the postcard printing application that are compatible with the platform of the mobile device 3 may be included in examples of the extended applications 48.

Referring back to FIG. 4A, when the OK button 124 is operated via the user I/F 13, the CPU 11 accepts selection of a function to be installed (S107), and accepts selection of default settings to be used for execution of the selected function (S109). For instance, the settings include a language setting and a country setting. Further, for instance, the settings for the printing function are configured for a plurality of items such as a sheet type, a sheet size, designation of a tray, and designation of duplex printing. Each of the settings may be selected from among a plurality of options for each item.

The CPU 11 installs a program into the PC 1 based on the various selections accepted in S107 and S109 (S111). Specifically, for instance, when receiving an operation of the OK button 124 with a function being selected from among the basic functions, the CPU 11 installs the print application 23, thereby incorporating the print application 23 into the PC 1. Then, the CPU 11 sets up the installed program and stores the setup information 25 in the memory 12 (S113). The setup information 25 includes device information 251 on the device selected in S101, and parameter information 252 on the function selected in S107 and the settings selected in S109. In substantially the same manner as described above, when receiving an operation of the OK button 124 with the CD label printing function selected, the CPU 11 installs the CD label printing application, thereby incorporating the CD label printing application into the PC 1.

In such a system as in the illustrative embodiment, a single user may own both the PC 1 and the mobile device 3, and may use the MFP 5 from both the PC 1 and the mobile device 3. In this case, the single user may set up the mobile device 3 following the setup of the PC 1. The mobile device 3 has a platform different from the platform of the PC 1. Therefore, in order for the mobile device 3 to perform the same function(s) as the PC 1, a corresponding program compatible with the mobile device 3 needs to be installed into the mobile device 3. Hence, the CPU 11 prepares for installation of the program compatible with the mobile device 3 into the mobile device 3 (S114-S129), following the installation of the program compatible with the PC 1 into the PC 1.

For instance, the mobile device 3 may not use a printer driver and may output print jobs by an OS-based printing system (e.g., Air Print), and some image processing apparatuses may not be compatible with such a printing system. Therefore, after setting up the print application 23, the CPU 11 determines whether the selected device is compatible with the mobile device 3 (S114).

Specifically, the CPU 11 determines whether the MFP 5 is compatible with the mobile device 3, from the model name obtained from the MFP 5 in S103. The installer 22 stores compatibility information indicating whether each image processing apparatus is compatible with the mobile device 3, in association with the model name of each image processing apparatus. The CPU 11 determines whether the MFP 5 is compatible with the mobile device 3 by checking the model name obtained from the MFP 5 against the compatibility information. The compatibility information may be stored in a server (e.g., the server 7) instead of the installer 22. In this case, the CPU 11 may inquire, of the server, whether the MFP 5 is compatible with the mobile device 3 by using the model name of the MFP 5.

When determining that the selected device is not compatible with the mobile device 3 (S114: No), the CPU 11 terminates the installation process without displaying the access information on the user I/F 13. Thus, the PC 1 does not display the access information regarding the device incompatible with the mobile device 3. Hence, the mobile device 3 is allowed to avoid a useless operation of reading the access information and installing the print application 43.

Meanwhile, when determining that the selected device is compatible with the mobile device 3 (S114: Yes), the CPU 11 performs processes to cause the user I/F 13 of the PC 1 to display the access information (S 115-S129).

Namely, the CPU 11 determines whether there is, among the basic functions, a function (hereinafter referred to as an "unselected function") that has not been selected as a function to be installed (S115). Suppose for instance that among the basic functions displayed on the function selection screen 120 (see FIG. 5), a check mark is placed in each check box 123 for the printing function and the scanning function, but is not placed in a check box for the fax function. In this situation, when the OK button 124 is operated, the CPU 11 determines that the fax function, among the basic functions, is an unselected function that has not been selected as a function to be installed (S115: Yes). In this case, the CPU 11 displays a function restriction confirmation screen 140 (see FIG. 6) on the user I/F 13 of the PC 1 (S121), and determines whether a function restriction instruction has been accepted (S123).

Figure 6:
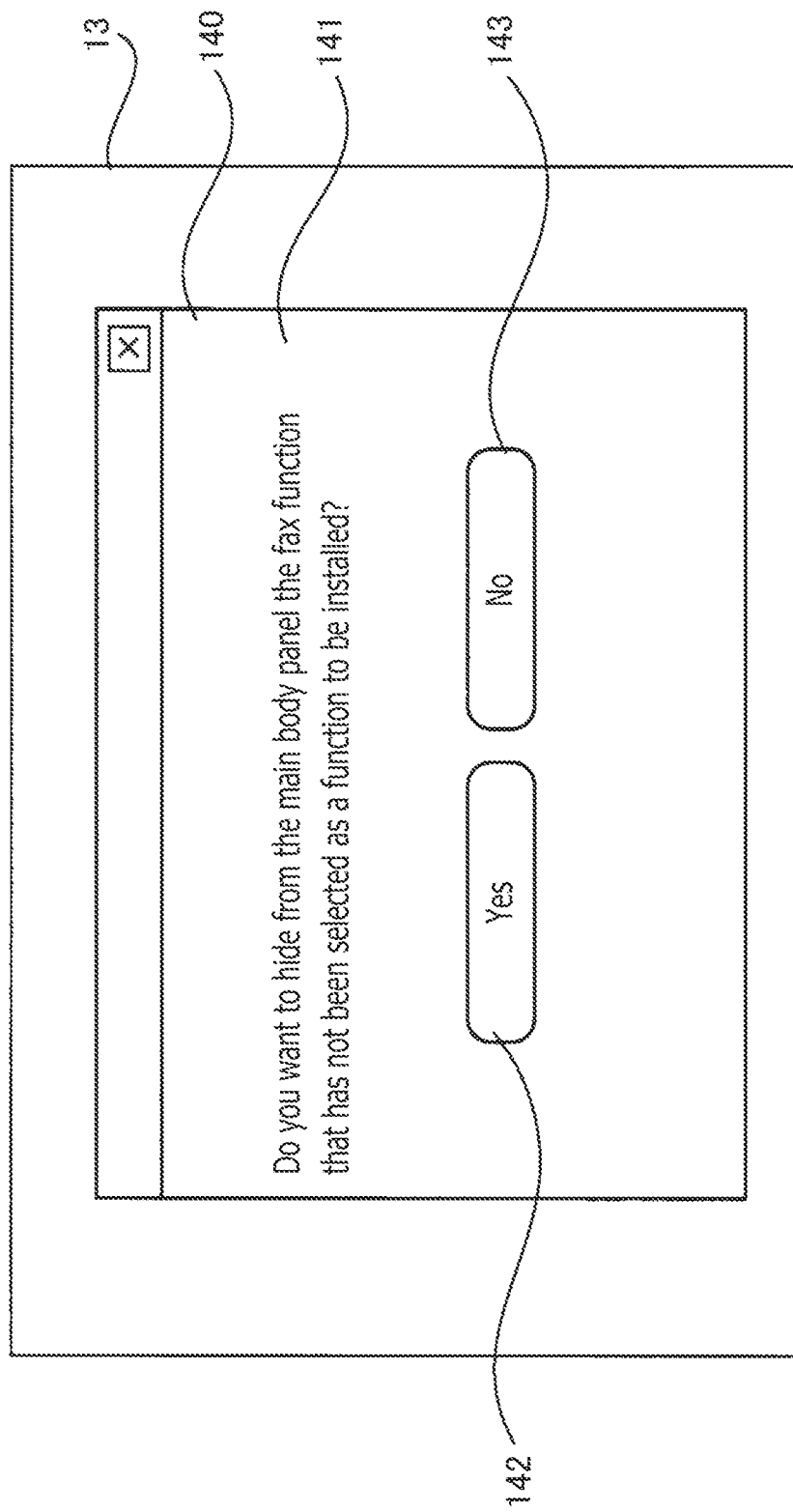
FIG. 6 shows an example of a function restriction confirmation screen displayed on the PC, according to one or more aspects of the present disclosure.

FIG. 6 shows an example of the function restriction confirmation screen 140. The function restriction confirmation screen 140 is for prompting the user to select whether to cause the MFP 5 to accept a user operation for the unselected function that was not selected at the time of installing the print application 23 into the PC 1. The function restriction confirmation screen 140 displays thereon a message 141, a "Yes" button 142, and a "No" button 143. The message 141 contains an inquiry about whether to hide, on the MFP 5, the unselected function that has not been selected as a function to be installed for installation. The "Yes" button 142 is an operable member to accept an instruction to hide the unselected function, i.e., the function restriction instruction to restrict the unselected function. The "No" button 143 is an operable member to accept an instruction to display the unselected function, i.e., an instruction to not restrict the unselected function.

Referring back to FIG. 4B, when the "Yes" button 142 is operated via the user I/F 13 of the PC 1, the CPU 11 accepts the function restriction instruction (S123: Yes) and sends a restriction command to the device selected in S101 via the communication I/F 14 (S125). The restriction command is a command that instructs the selected device to restrict input of user operations, and contains information specifying the unselected function that was not selected in S107. Thereafter, the CPU 11 proceeds to S127. Meanwhile, when the "No" button 143 is operated via the user I/F 13, the CPU 11 determines to not accept the function restriction instruction (S123: No). In this case, the CPU 11 skips S125, and goes to S127.

Figure 9A:
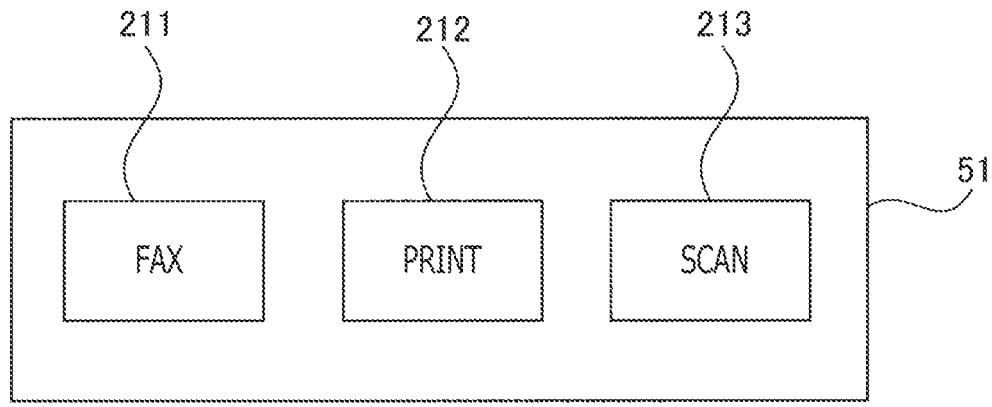
FIG. 9A shows an example of a function display screen displayed on the MFP, according to one or more aspects of the present disclosure.
Figure 9B:
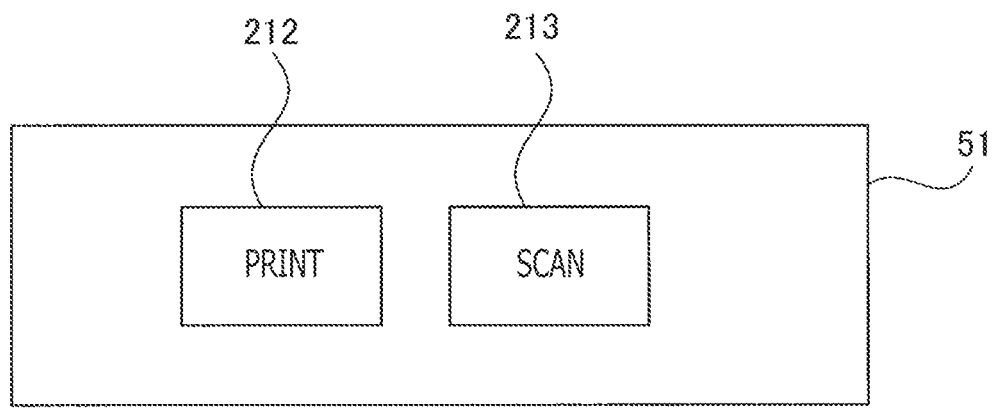
FIG. 9B shows another example of the function display screen when the MFP receives a restriction command from the PC, according to one or more aspects of the present disclosure.

FIGS. 9A and 9B show examples of a function display screen displayed on the MFP 5. When the MFP 5 has not received the restriction command, the MFP 5 causes the touch panel 51 to display icons for accepting execution instructions for all the basic functions, as shown in FIG. 9A. For instance, even when the fax function was not selected as a function to be installed at the time of installing the print application 23 into the PC 1, when the "No" button 143 is operated on the function restriction confirmation screen 140, the PC 1 does not send the restriction command In this case, the MFP 5 does not receive the restriction command, and causes the touch panel 51 to display icons 211, 212, and 213 for receiving the execution instructions for the fax function, the printing function, and the scanning function that are executable by the MFP 5. Thereby, the MFP 5 is not allowed to perform fax transmission using, for instance, the PC 1, but is allowed to perform fax transmission by operating the touch panel 51.

Figure 8:
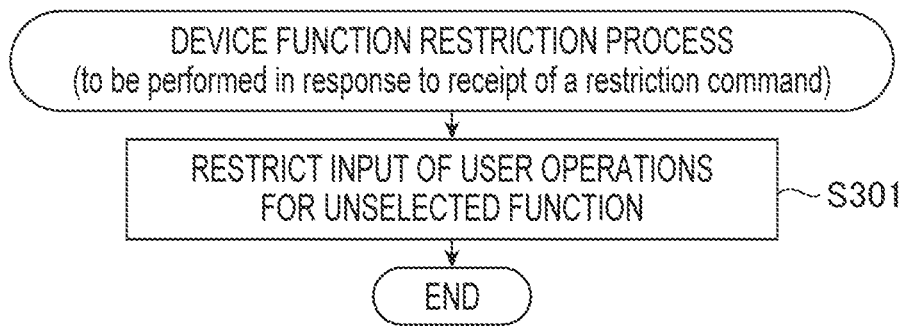
FIG. 8 is a flowchart showing a procedure of a device function restriction process to be performed by the MFP, according to one or more aspects of the present disclosure.

FIG. 8 is a flowchart showing a procedure of a device function restriction process. When receiving the restriction command from the PC 1, the MFP 5 restricts input of user operations for the unselected function specified by the restriction command (S301), as shown in FIG. 8. Specifically, for instance, in the case where the fax function was not selected as a function to be installed at the time of installing the print application 23 into the PC 1, in response to the "Yes" button 142 being operated on the function restriction confirmation screen 140, the PC 1 sends to the MFP 5 the restriction command including information specifying the fax function. When receiving the restriction command from the PC 1, the MFP 5 hides the icon 211 for the fax function, as shown in FIG. 9B, in such a manner as to not accept an instruction to execute the fax function.

For instance, the MFP 5 may restrict input of the instruction to execute the fax function by graying out the icon 211 and/or by providing an error notification when the icon 211 is operated. The MFP 5 may also restrict input of the settings for the fax function by operating a main body of the MFP 5.

Thus, the installer 22 sends the restriction command to the MFP 5 according to the result of the function selection at the time of installing the print application 23 into the PC 1. Thereby, it is possible to reflect the result of the function selection in the MFP 5.

In addition, the installer 22 enables the user to set whether to display the unselected function, which was not selected at the time of installing the print application 23 into the PC 1, on the main body of the MFP 5, thereby causing the MFP 5 to display or hide the unselected function in accordance with the user's intention.

Referring back to FIG. 4B, in S127, the CPU 11 determines whether there is a function selected as a function to be installed. For instance, when a check mark is placed in at least one of the check boxes 123 on the function selection screen 120 (see FIG. 5), that is, at least one function is selected via the function selection screen 120 (S127: Yes), the CPU 11 generates access information containing information specifying the corresponding URL and the selected function (S117).

Figure 5:
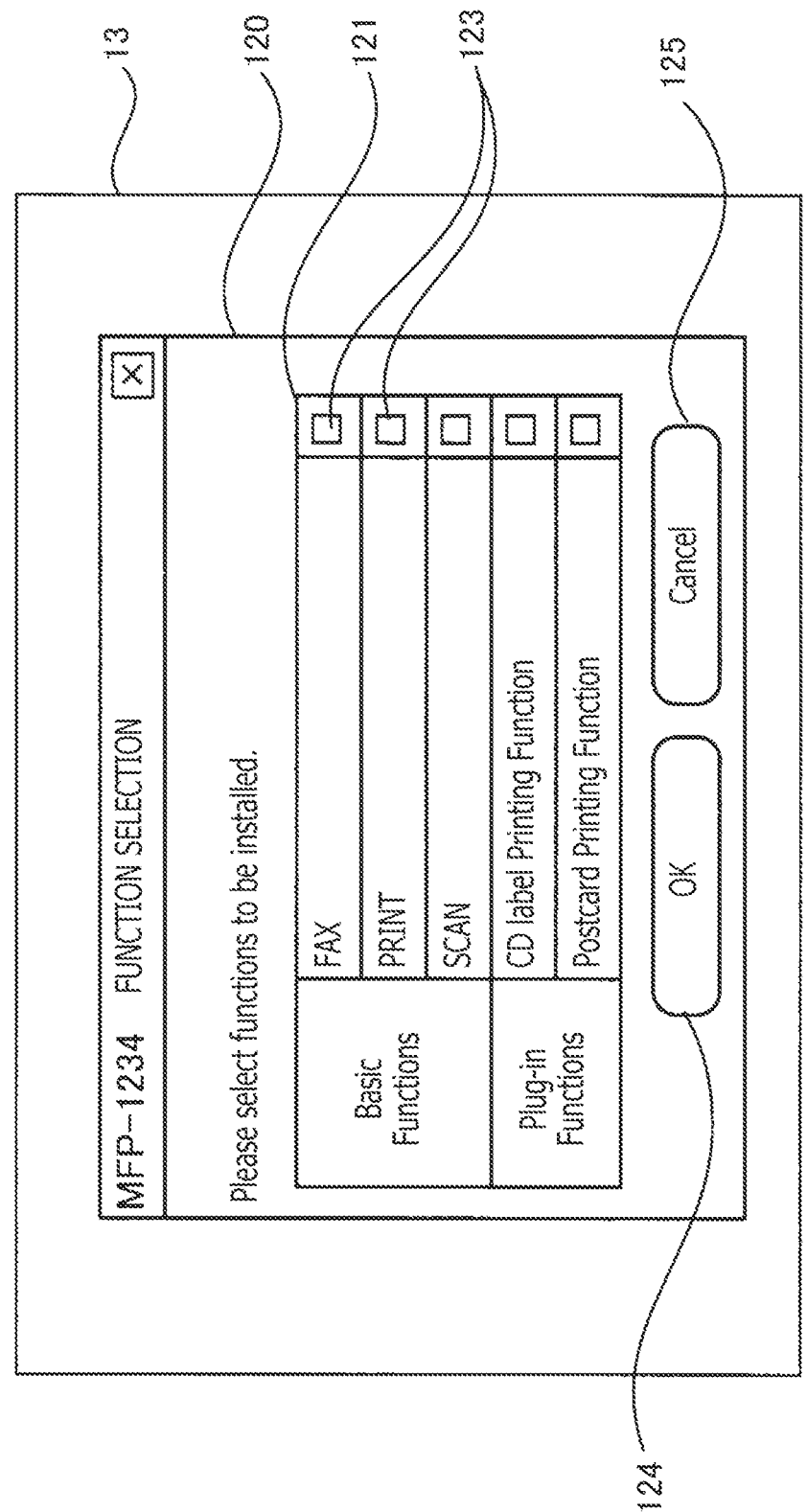
FIG. 5 shows an example of a function selection screen displayed on the PC, according to one or more aspects of the present disclosure.

Suppose for instance that on the function selection screen 120 shown in FIG. 5, the OK button 124 is operated in a state where a check mark is placed in each check box 123 for the fax function, the printing function, and the CD label printing function, to select the fax function, the printing function, and the CD label printing function. In this case, the CPU 11 extracts, from the URL information 24, the URL of the web page representing the site as the supply source for the print application 43 for mobile devices that is compatible with the model of the MFP 5. Then, the CPU 11 extracts, from the query information 26, query parameters corresponding to the selected fax function and the selected printing function. The CPU 11 generates the access information for the print application 43 by adding the extracted query parameters to an end of the extracted URL. In a case where only the printing function or the scanning function is selected as a function to be installed, the CPU 11 generates the access information by adding a query parameter indicating the printing function or the scanning function to the end of the URL. Thus, the CPU 11 generates the access information of which contents differ according to the selected function(s). More specifically, the end of the URL specified by the access information is different depending on the selected function(s).

Further, the CPU 11 extracts a URL and a query parameter for the CD label printing application compatible with the mobile device 3 from the URL information 24 and the query information 26, respectively, thereby generating access information for the CD label printing application. Thus, the CPU 11 may generate a plurality of pieces of access information containing respective URLs that are different for each corresponding application or each selected function.

The CPU 11 may generate the access information by further adding query parameters indicating the settings selected in S109 to the end of the corresponding URL. For instance, when "Language" is set to "Japanese" in S109, a query parameter indicating "Japanese" may be added in front of or behind the parameter indicating the corresponding function.

The CPU 11 encodes the access information generated in S117, thereby generating a QR code image for each access information (S118).

Figure 7:
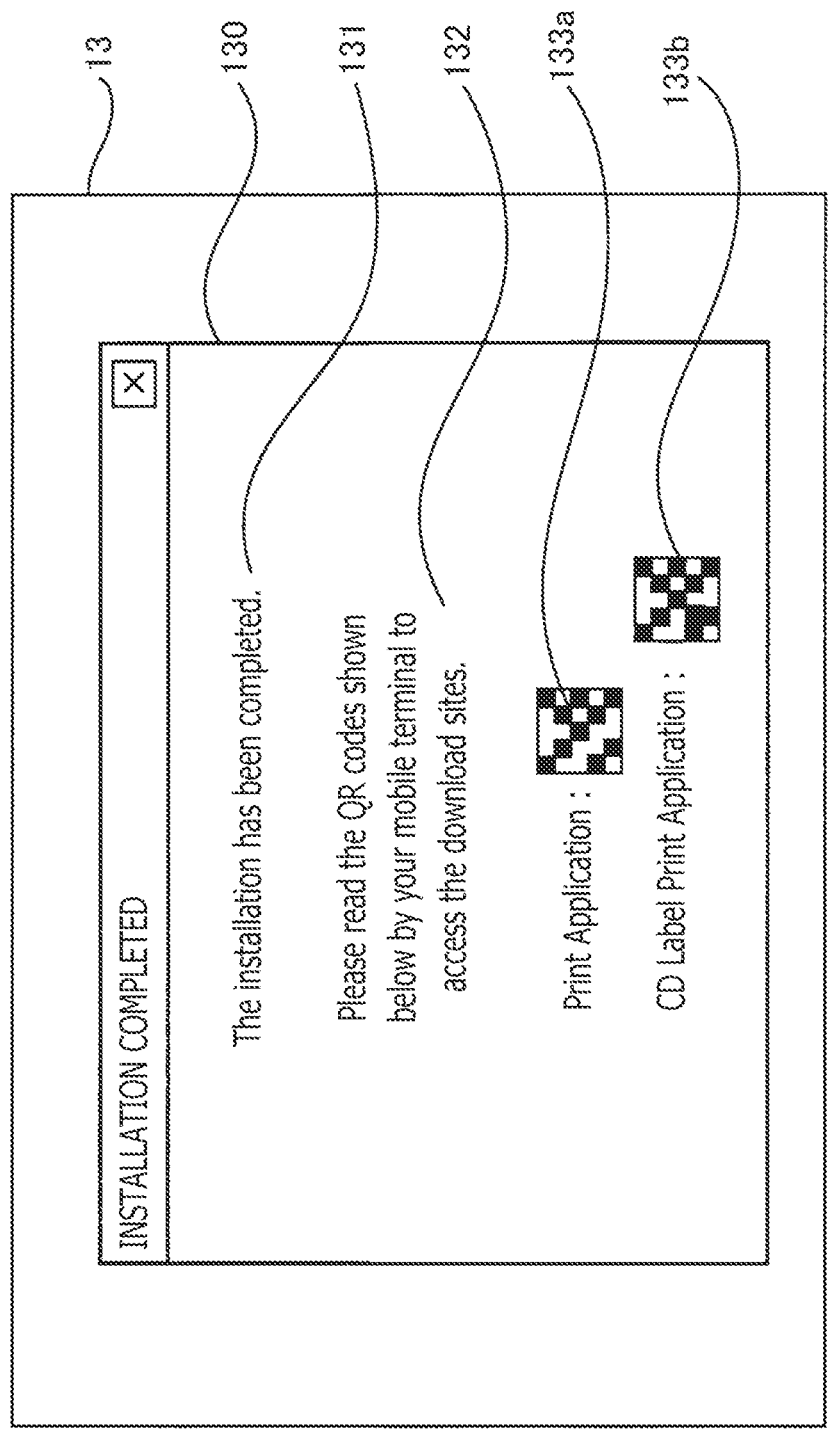
FIG. 7 shows an example of an access information display screen displayed on the PC, according to one or more aspects of the present disclosure.

The CPU 11 causes the user I/F 13 to display the QR code image(s) generated in S118 (S119). For instance, the CPU 11 displays, via the user I/F 13, an access information display screen 130 shown in FIG. 7. The access information display screen 130 displays thereon a completion message 131 for notifying the user that the installation has been completed, and a read message 132 for prompting the user to read the access information, along with QR code image(s) 133 representing the access information. For instance, when the printing function and the CD label printing function are selected as functions to be installed, the QR code image(s) 133 include a QR code image 133a for the print application 23 and a QR code image 133b for the CD label printing application. In another instance, when only the fax function is selected as a function to be installed, the QR code image(s) 133 include only the QR code image 133a for the print application 23. Thereafter, the CPU 11 terminates the installation process shown in FIGS. 4A and 4B.

As shown in FIG. 4B, when all the basic functions are selected as functions to be installed in S107 (S115: Yes), CPU 11 proceeds to S117 to generate the access information. Since the processes of S117 and the following steps have been described above, explanations thereof will be omitted.

Further, when there is an extended function that is selectable regardless of whether a basic function is selected, and only the extended function is selected (S115: Yes), the CPU 11 determines that there is a function selected as a function to be installed (S127: Yes) after executing S121 to S125. In this case, the CPU 11 extracts a URL corresponding to the selected extended function from the URL information 24, and generates the access information containing information specifying the extracted URL and the selected extended function (S117). Thereafter, the CPU 11 goes to S118. Since the processes of S121 to S125 and the processes of S118 and the following steps have been described above, and explanations thereof will be omitted.

Further, when the print application 23 is installed into the PC 1 without any function to be installed being selected in S107 (S115: Yes), the CPU 11 determines that there is no function selected (S127: No) after executing S121 to S125. In this case, the CPU 11 extracts a URL corresponding to the model of the selected device from the URL information 24, and generates the access information containing information specifying the extracted URL (S129). Thereafter, the CPU 11 proceeds to S118. Namely, the CPU 11 generates the access information that does not include any query parameters of functions. Since the processes of S118 and the following steps have been described above, explanations thereof will be omitted.

Subsequently, a process of installing a program compatible with the mobile device 3 into the mobile device 3 will be described below. In the following description, the QR code images 133a and 133b may be collectively referred to as the "QR code images 133."

The mobile device 3 activates the reading device 35 and causes the reading device 35 to read a QR code image 133 displayed on the user I/F 13 of PC 1 by the installer 22.

When the mobile device 3 decodes the read QR code image 133 and accesses the server 7 based on the URL represented by the QR code image 133, the server 7 provides the mobile device 3 with a web page based on a query parameter added to the end of the URL. The mobile device 3 causes the user I/F 33 to display the web page provided by the server 7.

Figure 10C:
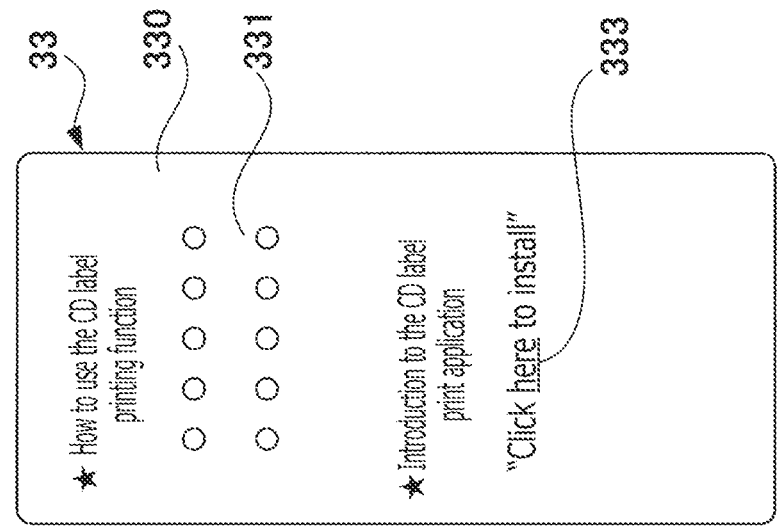
FIGS. 10A, 10B, and 10C show examples of web pages displayed on the mobile device, according to one or more aspects of the present disclosure.

Suppose for instance that the mobile device 3 reads, via the reading device 35, the QR code image 133 for the print application 43 that has been generated after selecting the MFP 5 and further selecting the fax function as a function to be installed and is being displayed on the user I/F 13 of the PC 1. In this case, the QR code image 133 (more specifically, the access information represented by the QR code image 133) contains a URL, to which the query parameter indicating the fax function is added, corresponding to the model of the MFP 5. The mobile device 3 accesses the server 7 via the communication I/F 34 based on the URL obtained by decoding the QR code image 133. The server 7 provides the mobile device 3 with a web page corresponding to the model of the MFP 5 and including a description of the fax function, according to the query parameter that is added to the end of the URL and indicates the fax function. The mobile device 3 causes the user I/F 33 to display a web page 310 provided by the server 7, for instance, as shown in FIG. 10A.

The web page 310 includes a description 311 of the fax function and a link 313 associated with the URL of the web page for installing the print application 43 for mobile devices. By reading the description 311, the user is allowed to learn how to use the fax function when attempting to set up the print application 23. When the function indicated by the query parameter added to the URL is the printing function, the server 7 provides the mobile device 3 with a web page that includes a description of the printing function. Thus, the mobile device 3 is allowed to display the web page corresponding to the selected function on the user I/F 33 simply by reading the QR code image. Accordingly, it is possible to reduce time and effort required for the user to search for the web page containing the description of the selected function.

When the access information includes a query parameter indicating "language," the server 7 provides the web page in the language indicated by the query parameter. Thereby, the mobile device 3 causes the user I/F 33 to display the web page 310 in the language used at the time of the installation of the print application 23. Thus, it is highly likely that the user is allowed to browse the web page on the mobile device 33 without translation.

Figure 10B:
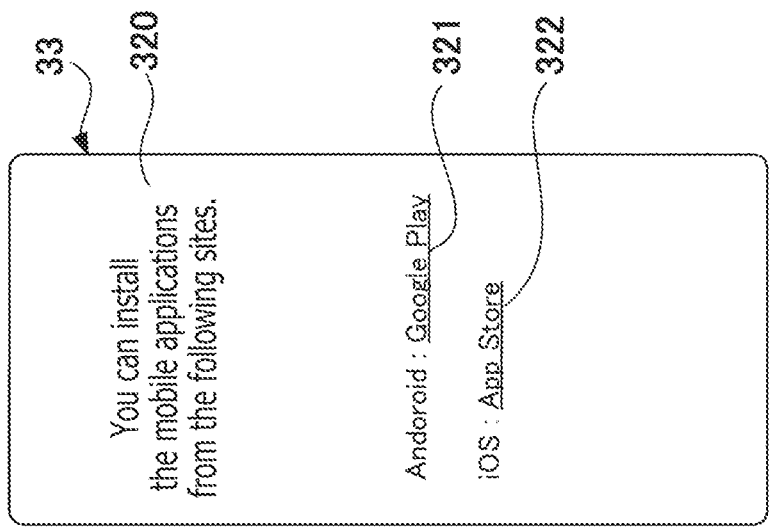
Figure 10A:
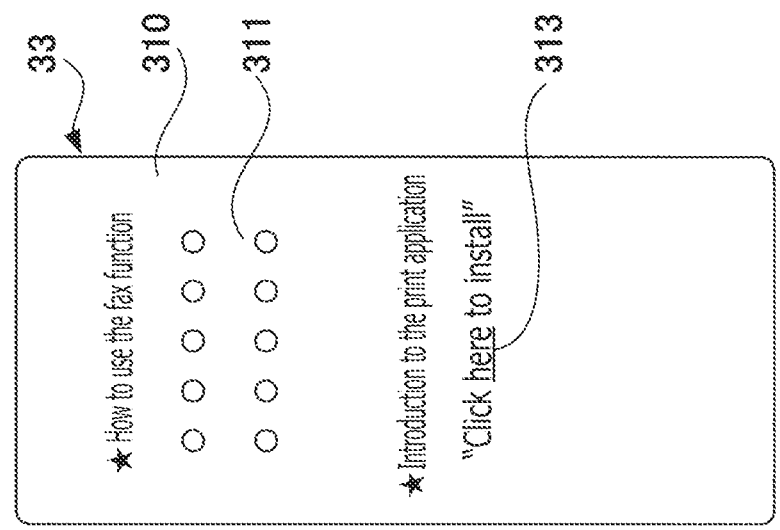

When the link 313 is operated via the user I/F 33, the mobile device 3 causes the user I/F 33 to display a web page 320 for installing the print application 43 for mobile devices, for instance, as shown in FIG. 10B. On the web page 320, links 321 and 322 for installing the print application 43 are posted for respective types of OS for the mobile device 3. Specifically, for instance, the link 321 is an Android-compatible link. The link 322 is an iOS-compatible link. The web page 320 may include a link associated with a web page of a download site provided by the vendor of the MFP 5.

For instance, when the link 321 is operated via the user I/F 33, the mobile device 3 accesses a site for the print application 43 provided by Google Play, and then starts installing the Android-compatible print application 43 in response to an installation instruction input via the site. At this time, the mobile device 3 installs the print application 43 using the OS 41. Thus, the web page 320 displayed on the mobile device 3 includes the links 321 and 322 for installing the program corresponding to the selected function. Accordingly, the mobile device 3 is allowed to easily access the web page for installing the program.

For instance, when reading, by the reading device 35, the QR code image 133b (see FIG. 7) for the CD label printing application compatible with the mobile device 3, the mobile device 3 causes the user I/F 33 to display a web page 330 shown in FIG. 10C. The web page 330 includes a description 331 of the CD label printing function and a link 333 for downloading the CD label printing application. Thus, the user is allowed to learn functions of and how to use the CD label printing application simply by reading the QR code image 133b. Accordingly, it is possible to reduce time and effort required for the user to search for the web page of the site for installing the CD label printing application.

When a function to be installed is not selected at the time of installing the program into the PC 1, the installer 22 generates access information based only on a URL corresponding to the model of the selected device, and displays a QR code image generated by encoding the access information on the user I/F 13 of the PC 1. When reading the QR code image by the reading device 35, the mobile device 3 displays, for instance, a web page on which a link is posted for each type of OS. In response to a link for the OS compatible with the mobile device 3 being selected via the web page, the mobile device 3 accesses the linked site. In this case, since a function to be installed is not selected, the mobile device 3 accesses a general-purpose program download site.

Figure 11:
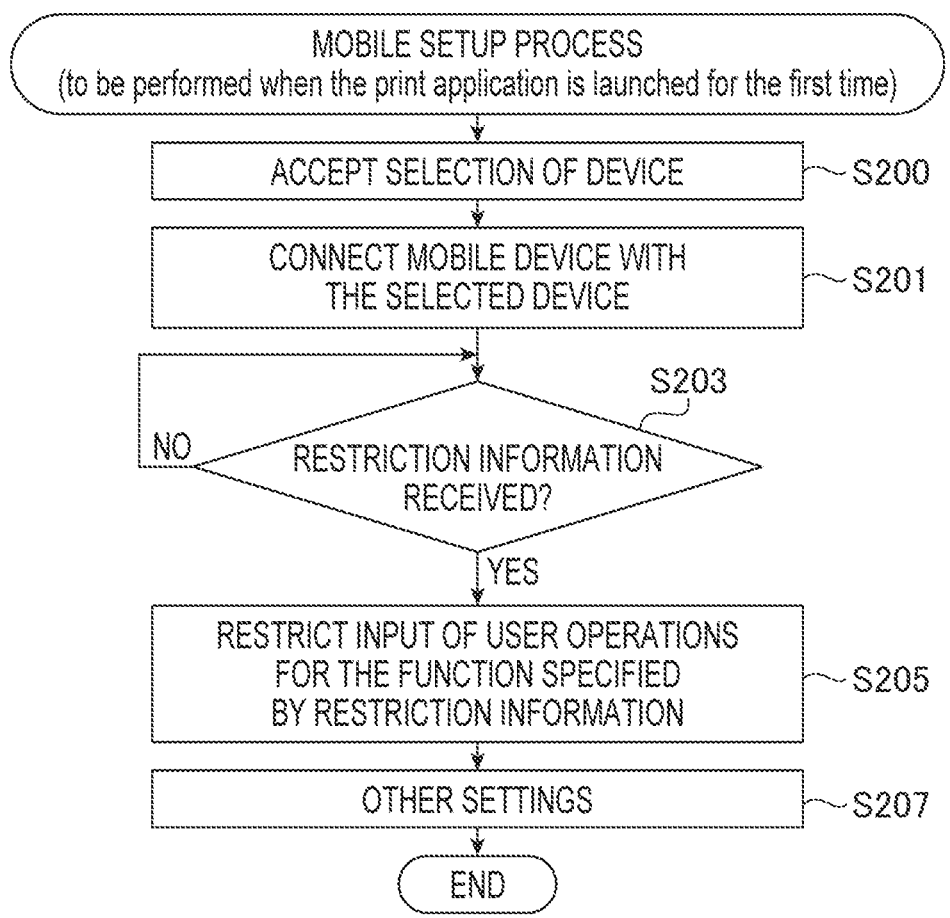
FIG. 11 is a flowchart showing a procedure of a mobile setup process to be performed by the mobile device, according to one or more aspects of the present disclosure.

The CPU 31 of the mobile device 3 performs a mobile setup process (see FIG. 11), for instance, when launching the print application 43 installed using the OS 41 for the first time. The CPU 31 accepts selection of a device (S200) and connects the mobile device 3 with the selected device via the communication I/F 34 (S201). The CPU 31 determines whether restriction information has been received from the MFP 5 (S203). When launching the print application 43 for the first time, the CPU 31 inquires, of the MFP 5, whether there is a function restricted. In response to the inquiry from the mobile device 3, the MFP 5 receives a restriction command from the PC 1. At this time, if input of user operations is restricted for a function specified by the received restriction command, the MFP 5 sends restriction information containing information specifying the restricted function to the mobile device 3. When receiving the restriction information via the communication I/F 34 (S203: Yes), the CPU 31 restricts input of user operations on the mobile device 3 for the function specified by the restriction information (S205).

For instance, when the MFP 5 restricts the fax function, the mobile device 3 also restricts input of user operations for the fax function of the print application 43. In this case, for instance, when using the print application 43, the mobile device 3 may hide or gray out operable members associated with the fax function, or may provide an error notification in response to an operable member associated with the fax function being operated.

Thus, the mobile device 3 sends to the MFP 5 the inquiry about the unselected function that was not selected at the time of installing the print application 23 into the PC 1. In this case, if there is a function restricted, the mobile device 3 also restricts input of user operations for the restricted function. Thereby, the installation result on the PC 1 is reflected in the mobile device 3.

After completing the other settings (S207), the CPU 31 terminates the mobile setup process. If the print application 23 is configured to analyze the URLs and the query parameters obtained by decoding the QR code images 133 and/or to analyze the web pages obtained from the server 7, the CPU 31 may, in S207, automatically store the model name of the MFP 5, the functions, and the settings as obtained by the analysis in the device information 451 and the parameter information 452 of the setup information 45. Accordingly, it is possible to reduce time and effort required for the user to input information necessary for installing the mobile applications into the mobile device 3. Thus, the mobile device 3 is allowed to, after the setup information 45 is set, control the MFP 5 according to the settings contained in the setup information 45.

In the illustrative embodiment, as described above, in response to installation of the print application 23 into the PC 1, the installer 22 causes the user I/F 13 of the PC 1 to display the QR code image 133a of the access information, which is based on the selected function and the URL of the web page representing the site of the supply source for the print application 43. The mobile device 3 may read the QR code image 133a displayed on the user I/F 13 of the PC 1, thereby accessing the web page 310 representing the site of the supply source for the print application 43, without having to accept an input of the URL via the user I/F 33. Thus, according to the installer 22 of the illustrative embodiment, it is possible to reduce time and effort required for the user to input information necessary for accessing the site for installing the print application 43 into the mobile device 3. Furthermore, at that time, the access information is generated based on the selected function. Thereby, it is possible to provide, via the web page 310, appropriate information according to the selected function to the mobile device 3 from the site specified by the access information. Namely, it makes it easier to use the selected function. Thus, according to the installer 22 of the illustrative embodiment, it is possible to reduce time and effort required for the user to set up the print application 43 for controlling the MFP 5 on the mobile device 3.

Hereinabove, the illustrative embodiment according to aspects of the present disclosure has been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that aspects of the present disclosure are capable of use in various other combinations and environments and are capable of changes or modifications within the scope of the inventive concept as expressed herein.

In the aforementioned illustrative embodiment, the MFP 5 has been described as an example of an "image processing apparatus" according to aspects of the present disclosure. However, besides the MFP 5, examples of the "image processing apparatus" according to aspects of the present disclosure may include, but are not limited to, printers for home or office use, image scanners, label printers, industrial printers, 3D printers, fax machines, sewing machines, and machine tools to perform processing according to image data. In other words, besides the print applications 23 and 43, programs to be set up may include, but are not limited to, scanner drivers, fax drivers, sewing instruction programs, embroidery instruction programs, and processing instruction programs. In addition, the number of PCs, the number of mobile devices, the number of MFPs, and the wording of display messages may not necessarily be limited to the examples as shown in the aforementioned illustrative embodiment.

When a plurality of functions are selected as functions to be installed, the CPU 11 of the PC 1 may generate access information by adding query parameters for the plurality of functions to a single URL, and may cause the user I/F 13 to display a QR code image of the access information. In this case, the mobile device 3 may cause the user I/F 33 to display a web page on which the plurality of functions contained in the access information are listed.

In the aforementioned illustrative embodiment, the access information is shown as the QR code image. However, the access information may be shown as another code image such as a two-dimensional barcode.

In the aforementioned illustrative embodiment, the server 7 changes contents of the description 311 of the function to be displayed on the web page 310 by changing a text indicated by a corresponding query parameter. However, for instance, the server 7 may prepare a plurality of web pages for the function. In this case, the server 7 may switch a web page to be displayed, according to a corresponding query parameter.

In the aforementioned illustrative embodiment, the installer 22 stores the URL information 24 and the query information 26 separately. However, for instance, the server 7 may have a plurality of web pages, and the installer 22 may store a URL of a web page for each function. In this case, the installer 22 may extract the URL according to the selected function, thereby generating the access information. Thus, in this case as well, the installer 22 makes it possible for the mobile device 3 to access the server 7 and cause the server 7 to provide the web page corresponding to the function to the mobile device 3.

The process of S118 in FIG. 4B may be omitted. In this case, the CPU 11 may display the access information in text to represent the URL of the web page on the user I/F 13 in S119. Further, in this case, the mobile device 3 may read the text with the reading device 35 and obtain the URL by text analysis processing such as OCR, thereby accessing the server 7. However, execution of S118, as in the aforementioned illustrative embodiment, makes it easier for the mobile device 3 to read the access information with no need for the text analysis processing.

The processes of S115 and S121 to S125 in FIG. 4B may be omitted. However, by sending to the image processing apparatus the restriction command regarding the unselected function in S125, and by restricting input of user operations for the unselected function on the image processing apparatus, it is possible to reflect, in the image processing apparatus, the result of the function selection in the installation process by the PC 1. Further, by allowing the user to select, in S121 of the installation process, whether to restrict the input of user operations on the image processing apparatus for the unselected function that was not selected in S107, it is possible to avoid the input of user operations on the image processing apparatus for the unselected function from being restricted against the user's intention.

The processes of S114 to S129 in FIG. 4B may be performed by (the CPU 11 executing) the print application 23. Further, some (e.g., generation and display of the access information) of S114 to S129 may be performed by the print application 23, and the other thereof may be performed by the installer 22. Specifically, for instance, instead of the installer 22 causing the CPU 11 to display the QR code image, the print application 23 for PC may, when executed, cause the CPU 11 to display the QR code image on the user I/F 13 of the PC 1. In this case, the print application 23 may cause the CPU 11 to display the QR code image in response to acceptance of a display instruction, or may cause the CPU 11 to always display the QR code image while executing the print application 23.

For instance, the plurality of QR code images 133a and 133b may not necessarily be displayed on the same page, but may be displayed on separate pages.

For instance, the process of S118 in FIG. 4B may be performed at a different timing from the installation process. However, by the installer 22 causing the CPU 11 to display the access information following the installation of the print application 23 into the PC 1 as in the aforementioned illustrative embodiment, it is possible to save time and effort required for the user to install the print application 43 into the mobile device 3 following the installation of the print application 23 into the PC 1.

For instance, the process of S118 in FIG. 4B may be performed before S107. For instance, the CPU 11 may obtain the model name of the selected device in S103, and then generate the access information based on an address of a web page corresponding to the obtained model name In this case, the generated access information does not contain information specifying a selected function. However, when the process of S118 is performed after S107 as in the aforementioned illustrative embodiment, once the selection of a function is completed, the access information to be displayed is determined based on the selected function. Thus, in the aforementioned illustrative embodiment, the installer 22 causes the CPU 11 to display the access information on the user I/F 13 shortly after completing the selection of a function. Thereby, it is possible to promptly start setting up the print application 43 into the mobile device 3 while confirming the description of the selected function.

The mobile device 3 may not receive the restriction information from the MFP 5. In this case, the mobile device 3 may accept input of user operations for the function restricted on the MFP 5. However, by the mobile device 3 sending to the MFP 5 an inquiry about the unselected function and restricting input of user operations for the unselected function, as in the aforementioned illustrative embodiment, it is possible to easily reflect the installation result on the PC 1 in the mobile device 3.

In the aforementioned illustrative embodiment, in the installation process to install the print application 23 into the PC 1, the installer 22 causes the CPU 11 to display on the user I/F 13 the access information corresponding to the print application 43 or the QR code image 133 generated by encoding the access information. However, if the print application 43, which is compatible with the MFP 5 and the mobile device 3, is stored in the MFP 5, the installer 22 may not have to cause the CPU 11 to display the access information or the QR code image 133 on the user I/F 13 after installing the print application 23 into the PC 1. In this case, the mobile device 3 may obtain, from the MFP 5, the print application 43 stored in the MFP 5 and incorporate the print application 43 into the memory 32. Thereby, through direct communication with the MFP 5, the mobile device 3 may obtain the print application 43 from the MFP 5 and install the print application 43 into the mobile device 3. Thus, for instance, it is possible to reduce time and effort required for the user to input information required to access a site for installing the print application 43. In addition, even in an environment where the mobile device 3 is unable to connect with the Internet or the server 7, the mobile device 3 may install the print application 43.

In each flowchart described in the present disclosure, a plurality of arbitrary steps may be changed in their execution order, or may be executed in parallel, to such an extent that there is no inconsistency in the processing contents and results.

Each process described in the present disclosure may be performed by at least one of hardware processors such as CPUs and ASICs, alone or in cooperation. Each process described in the present disclosure may be achieved in various forms such as a method and a non-transitory computer-readable storage medium storing computer-readable instructions for performing each process.

In the aforementioned illustrative embodiment, the installer 22 is configured to generate the access information based on the URL stored in the URL information 24 and the query parameters stored in the query information 26, and cause the user I/F 13 of the PC 1 to display the QR code image representing the generated access information. However, instead of displaying the QR code image on the user I/F 13, the installer 22 may cause the PC 1 to output the QR code image by printing out the QR code image using a printer. Further, in the aforementioned illustrative embodiment, the PC 1 and the mobile device 3 have their respective different platforms. However, the PC 1 and the mobile device 3 may have the same platform. Examples of the platform for the PC 1 may include, but are not limited to, Windows ("Windows" is a registered trademark of Microsoft Corp.), macOS ("macOS" is a registered trademark of Apple Inc.), Linux ("Linux" is a registered trademark of Linus Torvalds), Chrome OS ("Chrome OS" is a registered trademark of Google LLC), and UOS ("UOS" is a registered trademark of Uniontech Software Technology Co., Ltd.). Examples of the platform for the mobile device 3 may include, but are not limited to, iOS ("iOS" is a registered trademark of Cisco Systems, Inc.), Android ("Android" is a registered trademark of Google LLC), and HarmonyOS ("HarmonyOS" is a registered trademark of Huawei Technologies Co., Ltd.). Any combination may be applied as a combination of one of the available choices for the platform for the PC 1 and one of the available choices for the platform for the mobile device 3.

The following shows examples of associations between elements exemplified in the aforementioned illustrative embodiments and modifications and elements according to aspects of the present disclosure. The system 100 may be an example of a "system" according to aspects of the present disclosure. The PC 1 may be an example of a "first terminal device" according to aspects of the present disclosure, and may be an example of an "information processing device" according to aspects of the present disclosure. The mobile device 3 may be an example of a "second terminal device" according to aspects of the present disclosure, and may be an example of "another information processing device" according to aspects of the present disclosure. However, in another instance, the mobile device 3 may be an example of the "first terminal device" according to aspects of the present disclosure, and may be an example of the "information processing device" according to aspects of the present disclosure. In this case, the PC 1 may be an example of the "second terminal device" according to aspects of the present disclosure, and may be an example of the "another information processing device" according to aspects of the present disclosure. The MFP 5 may be an example of an "image processing apparatus" according to aspects of the present disclosure. The controller 10 of the PC 1 may be an example of a "controller" of the "information processing device" according to aspects of the present disclosure, and may be an example of a "first controller" of the "first terminal device" according to aspects of the present disclosure. The CPU 11 may be an example of a "processor" of the "first terminal device" according to aspects of the present disclosure, and may be an example of a "processor" included in the "controller" of the "information processing device" according to aspects of the present disclosure. The memory 12 storing the installer 22 may be an example of a "non-transitory computer-readable medium" storing "computer-readable instructions" according to aspects of the present disclosure, and may be an example of a "memory" storing "computer-readable instructions" that is included in the "controller" of the "information processing device" according to aspects of the present disclosure. The print application 23 and the extended applications 28 may be included in examples of a "first program" according to aspects of the present disclosure, and may be included in examples of a "first-platform-compatible program" according to aspects of the present disclosure. The print application 43 and the extended applications 48 may be included in examples of a "second program" according to aspects of the present disclosure, and may be included in examples of a "second-platform-compatible program" according to aspects of the present disclosure. The controller 30 of the mobile device 3 may be an example of a "second controller" of the "second terminal device" according to aspects of the present disclosure. The user I/F 13 of the PC 1 may be an example of a "display" of the "first terminal device" according to aspects of the present disclosure, may be an example of a "display" of the "information processing device" according to aspects of the present disclosure, and may be an example of a "first display" of the "first terminal device" according to aspects of the present disclosure. The user I/F 33 of the mobile device 3 may be an example of a "second display" of the "second terminal device" according to aspects of the present disclosure. The communication I/F 14 of the PC 1 may be an example of a "first communication interface" of the "first terminal device" according to aspects of the present disclosure. The communication I/F 34 of the mobile device 3 may be an example of a "second communication interface" of the "second terminal device" according to aspects of the present disclosure. The reading device 35 of the mobile device 3 may be an example of a "reading device" of the "second terminal device" according to aspects of the present disclosure.

What is claimed is:

1. A non-transitory computer-readable medium storing computer-readable instructions that are executable by a processor of a first terminal device compatible with a first platform, the instructions being configured to, when executed by the processor, cause the first terminal device to:
    accept selection of an image processing apparatus from among one or more devices connected with the first terminal device;
    accept selection of a function to be set up on the first terminal device, from among one or more functions executable by the selected image processing apparatus;
    install, into the first terminal device, a first program compatible with the selected image processing apparatus and the first platform; and
    output an access information image, the access information image representing access information based on the selected function and an address of a web page representing a site of a supply source for a second program, the second program being compatible with the selected image processing apparatus and a second platform.

2. The non-transitory computer-readable medium according to claim 1,
    wherein the access information image is configured to, when read by a second terminal device compatible with the second platform, cause the second terminal device to obtain the access information, thereby enabling the second terminal device to access the address represented by the access information and to obtain and display the web page corresponding to the selected function.

3. The non-transitory computer-readable medium according to claim 2,
wherein the web page contains a description of the selected function.

4. The non-transitory computer-readable medium according to claim 2,
wherein the web page contains a link for installing a program for the selected function.

5. The non-transitory computer-readable medium according to claim 1,
wherein the access information contains a URL with a parameter representing the selected function being added to the address of the web page representing the site of the supply source for the second program.

6. The non-transitory computer-readable medium according to claim 1,
wherein the instructions are further configured to, when executed by the processor, cause the first terminal device to output, as the access information image, a code image generated by encoding the access information.

7. The non-transitory computer-readable medium according to claim 1,
wherein the instructions are further configured to, when executed by the processor, cause the first terminal device to send a restriction command to the selected image processing apparatus, the restriction command indicating an unselected function that has not been selected as the function to be set up on the first terminal device, the restriction command being configured to, when received by the selected image processing apparatus, cause the selected image processing apparatus to restrict input of a user operation for the unselected function indicated by the restriction command.

8. The non-transitory computer-readable medium according to claim 7,
wherein the instructions are further configured to, when executed by the processor, cause the first terminal device to:
when the unselected function is among the one or more functions executable by the selected image processing apparatus, determine whether to restrict the input of the user operation for the unselected function;
when determining to restrict the input of the user operation for the unselected function, send the restriction command to the selected image processing apparatus; and
when determining to not restrict the input of the user operation for the unselected function, not send the restriction command to the selected image processing apparatus.

9. An information processing device comprising:
a user interface; and
a controller configured to:
accept, via the user interface, selection of an image processing apparatus from among one or more devices connected with the information processing device, the information processing device being compatible with a first platform;
accept, via the user interface, selection of a function to be set up on the information processing device, from among one or more functions executable by the selected image processing apparatus; and
output an access information image, the access information image representing access information based on the selected function and an address of a web page representing a site of a supply source for a second-platform-compatible program, the second-platform-compatible program being compatible with the selected image processing apparatus and a second platform.

10. The information processing device according to claim 9,
wherein the access information image is configured to, when read by another information processing device compatible with the second platform, cause the another information processing device to obtain the access information, thereby enabling the another information processing device to access the address represented by the access information and to obtain and display the web page corresponding to the selected function.

11. The information processing device according to claim 9,
wherein the controller is further configured to:
install, into the information processing device, a first-platform-compatible program compatible with the selected image processing apparatus and the first platform; and
after completion of the installation of the first-platform-compatible program, output the access information image.

12. The information processing device according to claim 9,
wherein the controller is further configured to output the access information image, after accepting the selection of the image processing apparatus and accepting the selection of the function to be set up on the information processing device.

13. The information processing device according to claim 9,
wherein the controller comprises:
a processor; and
a memory storing computer-readable instructions configured to, when executed by the processor, cause the controller to:
accept the selection of the image processing apparatus;
accept the selection of the function to be set up on the information processing device; and
output the access information image.

14. A system comprising:
an image processing apparatus having one or more executable functions;
a first terminal device compatible with a first platform; and
a second terminal device compatible with a second platform,
wherein the first terminal device comprises:
a first controller configured to:
accept selection of a function to be set up on the first terminal device, from among the one or more functions executable by the image processing apparatus;
install, into the first terminal device, a first program compatible with the image processing apparatus and the first platform; and
output an access information image, the access information image representing access information based on the selected function and an address of a web page representing a site of a supply source for a second program, the second program being compatible with the image processing apparatus and the second platform, wherein the second terminal device comprises:
- a reading device;
- a display; and
- a second controller configured to:
  - read, by the reading device, the access information image output by the first terminal device, thereby obtaining the access information; and
  - access the address represented by the obtained access information, obtain the web page corresponding to the selected function, and display the obtained web page on the display.

15. The system according to claim 14,
wherein the first terminal device further comprises a first communication interface,
wherein the first controller is further configured to send a restriction command to the image processing apparatus via the first communication interface, the restriction command indicating an unselected function that has not been selected as the function to be set up on the first terminal device, and
wherein the image processing apparatus is configured to, when receiving the restriction command, restrict input of a user operation for the unselected function indicated by the received restriction command.

16. The system according to claim 15,
wherein the second terminal device further comprises a second communication interface, and
wherein the second controller is further configured to:
- receive restriction information from the image processing apparatus via the second communication interface, the restriction information indicating the unselected function for which the image processing apparatus restricts the input of the user operation; and
- restrict input of a user operation for the unselected function indicated by the received restriction information.

* * * * *